United States Patent [19]
Rubin et al.

[11] Patent Number: 5,764,835
[45] Date of Patent: Jun. 9, 1998

[54] FLUOROPOLYMER FIBER REINFORCED INTEGRAL COMPOSITE CABLE JACKET AND TUBING

[75] Inventors: Edward A. Rubin, Phoenix; Craig W. Irwin, Tempe; Ted R. Farnsworth, Phoenix, all of Ariz.

[73] Assignee: W. L. Gore & Associates, Inc., Newark, Del.

[21] Appl. No.: 756,715

[22] Filed: Nov. 26, 1996

Related U.S. Application Data

[63] Continuation of Ser. No. 646,446, May 7, 1996, abandoned.

[51] Int. Cl.$^6$ .......................................... G02B 6/44
[52] U.S. Cl. ........................................... 385/104
[58] Field of Search ............................. 385/100–105, 385/147

[56] References Cited

U.S. PATENT DOCUMENTS

| | | | |
|---|---|---|---|
| 4,502,364 | 3/1985 | Zucker et al. | 428/364 |
| 4,515,435 | 5/1985 | Anderson | 385/100 |
| 4,603,942 | 8/1986 | Chang et al. | 428/396 |
| 4,711,388 | 12/1987 | Winter et al. | 428/383 |
| 4,723,831 | 2/1988 | Johnson et al. | 428/113 |
| 4,781,432 | 11/1988 | Zongor et al. | 428/365 |
| 4,818,060 | 4/1989 | Arroyo | 428/218 |
| 4,850,672 | 7/1989 | Zimmermann | 174/11 R |
| 5,071,221 | 12/1991 | Fujitani et al. | 385/114 |
| 5,087,110 | 2/1992 | Inagaki et al. | 385/110 |
| 5,133,034 | 7/1992 | Arroyo et al. | 385/107 |
| 5,138,684 | 8/1992 | Bullock et al. | 385/113 |
| 5,148,509 | 9/1992 | Kannabiran | 385/109 |
| 5,157,752 | 10/1992 | Greveling et al. | 385/112 |
| 5,165,993 | 11/1992 | van Anholt et al. | 385/113 |
| 5,171,635 | 12/1992 | Randa | 138/109 |
| 5,201,020 | 4/1993 | Kannabiran | 385/113 |
| 5,230,937 | 7/1993 | Effenberger et al. | 385/100 |
| 5,240,769 | 8/1993 | Ueda et al. | 385/100 |
| 5,261,021 | 11/1993 | Pasta et al. | 385/100 |
| 5,267,338 | 11/1993 | Bullock et al. | 385/100 |
| 5,361,806 | 11/1994 | Lalikos et al. | 138/109 |
| 5,389,442 | 2/1995 | Arroyo et al. | 385/100 |
| 5,399,418 | 3/1995 | Hartmanns et al. | 385/100 |
| 5,455,881 | 10/1995 | Bosissio et al. | 385/100 |
| 5,472,541 | 12/1995 | Simmons et al. | 385/100 |

FOREIGN PATENT DOCUMENTS

| | | | |
|---|---|---|---|
| 52-56550 | 5/1977 | Japan | 385/100 |

*Primary Examiner*—Akm E. Ullah
*Attorney, Agent, or Firm*—Victor M. Genco, Jr.

[57] ABSTRACT

An improved integral composite cable jacket or tubing is disclosed wherein a fluoropolymer fiber array is disposed between a first and second elastomer jacket layer. At least one of the elastomer jacket layers is comprised of silicone. The first and second elastomer jacket layers are bonded together through predetermined open spaces defined by the fiber array.

18 Claims, 2 Drawing Sheets

$F_H$ = HOOP FORCE
$F_A$ = AXIAL FORCE
P = PRESSURE LOAD

FLUOROPOLYMER FIBER REINFORCED INTEGRAL COMPOSITE CABLE JACKET AND TUBING

CROSS REFERENCE TO RELATED APPLICATION

This application is a continuation of U.S. Ser. No. 08/646,446, filed May 7, 1996 now abandoned.

FIELD OF THE INVENTION

This invention relates to the field of reinforced cable jackets and tubing. More particularly, the present invention provides an improved elastomer and fluoropolymer fiber reinforced composite for use as cable jacket or tubing.

BACKGROUND OF THE INVENTION

Cable jackets are often comprised of elastomeric materials that provide protection from corrosive chemical and/or high temperature environments. Despite these jackets exhibiting satisfactory flexibility in some applications, the handling of a jacketed cable imposes axial forces thereupon which cause elastomeric jackets to stretch or elongate over a cable core. Such axial forces are particularly problematic in low modulus homogeneous elastomeric jacket materials.

Conventional elastomeric jackets generally do not uniformly return to a relaxed state, from an elongated state, because the jacket sticks to the cable core. This causes localized regions where the jacket wall thickness is reduced. Typically, these localized regions are sites of mechanical failure. Additionally, jacket wall thickness reduction during normal cable use degrades cut-through resistance of the jacket.

A need exists for a cable that does not allow significant jacket wall thickness reduction during handling. Such a cable would be particularly useful in phaco emulsification surgery, autoclave sterilizable devices, interventional magnetic resonance imaging devices which require a non-metal reinforcement, high flex robotic applications, and pharmaceutical and food processing, particularly when biotoxicity is of concern. Additionally, this cable would not introduce the electrical and/or health hazards associated with broken ends of fatigued metallic wire penetrating to either the inside or outside of the cable.

The foregoing illustrates limitations known to exist in present cable jackets and tubing. Thus, it is apparent that it would be advantageous to provide an improved cable jacket and tubing directed to overcoming one or more of the limitations set forth above. Accordingly, a suitable alternative is provided including features more fully disclosed hereinafter.

SUMMARY OF THE INVENTION

A preferred embodiment of the present invention comprises a signal transmission core, a first elastomer jacket layer disposed about the core, a fiber array disposed about the first elastomer jacket layer, and a second elastomer jacket layer disposed about the fiber array. The second elastomer jacket layer is bonded to the first elastomer jacket layer through a curing process. Preferably, the first and second elastomer jacket layers are formed of silicone and the fiber array is formed from individual high modulus fibers comprised at least in part of polytetrafluoroethylene. The fiber array may comprise a plurality of configurations, such as but not limited to a braided configuration or served configuration, for example.

In another embodiment of the present invention, an improved tube is formed comprising a first tubular shaped elastomer material, a fiber array disposed about the first tubular shaped elastomer material, and a second tubular shaped elastomer material disposed about the fiber array. The second tubular shaped elastomer material is bonded to the first tubular shaped elastomer material through a curing process.

Accordingly, it is a primary purpose of the present invention to provide an improved cable jacket to reduce cable strain without significantly increasing cable bending stiffness.

It is another purpose of the present invention to provide an improved cable jacket having a fiber array disposed within an elastomer layer to prevent jacket wall thickness reduction during handling of the cable.

It is yet another purpose of the present invention to provide an improved cable jacket having a fiber array that is resistant to chemicals and heat which are employed in sterilization procedures.

Yet another purpose of the present invention is to provide an improved cable jacket or tubing which is resistant to temperatures in excess of 400° F., chemical attack, and water absorption.

Yet another purpose of the present invention is to provide an improved elastomer-fiber reinforced tubing.

BRIEF DESCRIPTION OF THE DRAWINGS

The foregoing summary, as well as the following detailed description of a preferred embodiment of the invention, will be better understood when read in conjunction with the appended drawings. For purposes of illustrating the invention, there is shown in the drawings an embodiment which is presently preferred. It should be understood, however, that the invention is not limited to the precise arrangement and instrumentality shown. In the drawings.

DETAILED DESCRIPTION OF THE INVENTION

Figure 1:
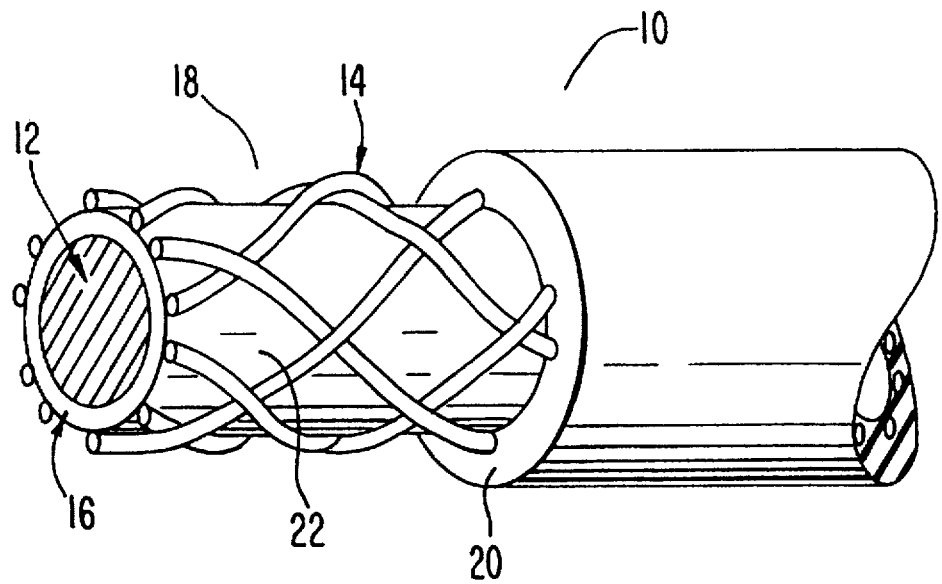
FIG. 1 is a partial perspective view of one embodiment of an improved fluoropolymer fiber reinforced composite cable jacket of the present invention, wherein a fluoropolymer fiber array is disposed in a braided configuration which forms equiangular open portions in the array.
Figure 2:
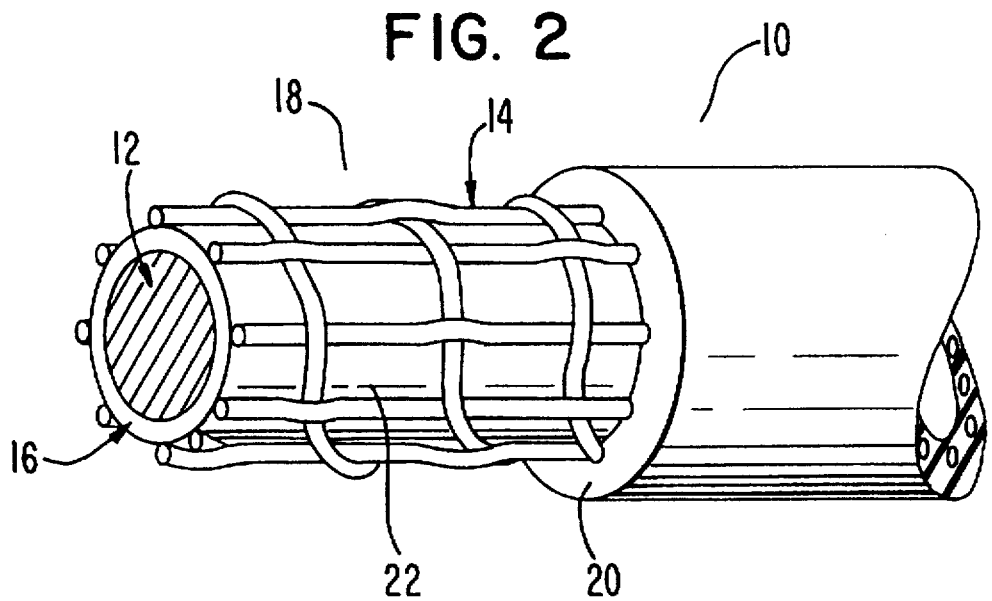
FIG. 2 is a partial perspective view of an alternate embodiment of the present invention, wherein the fiber array is braided in two directions at unequal angles to a centerline of the cable.
Figure 3:
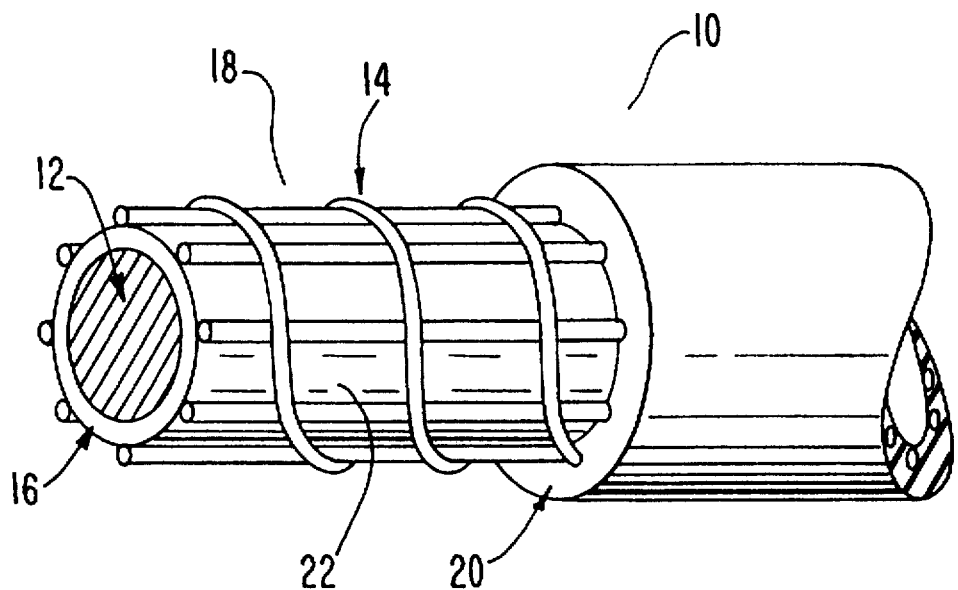
FIG. 3 is a partial perspective view of an alternate embodiment of the present invention, wherein the fiber array is arranged in a helical served configuration over longitudinally disposed fibers.
Figure 4:
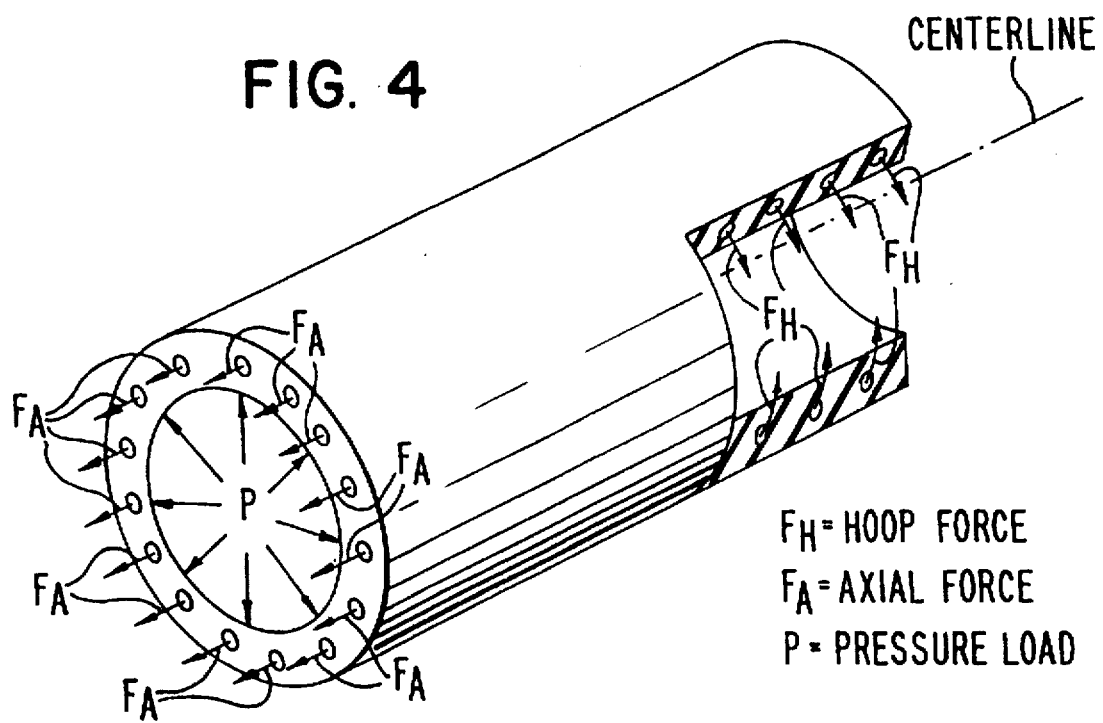
FIG. 4 is a diagram illustrating typical mechanical forces which may be exerted upon a cable jacket during use.

Referring to the drawings, wherein similar reference characters designate corresponding parts throughout several views, the improved cable jacket of the present invention is generally illustrated at 10 in FIGS. 1–3. The improved cable jacket 10 includes a signal transmission core 12, a first inner elastomer jacket layer 16, individual fluoropolymer fibers 14 which form a fiber array 18, and a second outer elastomer jacket layer 20. As the term is used herein, "fiber" is intended to mean any strand of a fluoropolymer material whether a single thread, or multiple threads, braided, twisted or otherwise. In a preferred embodiment of the present invention, the fluoropolymer fibers are comprised of tetrafluoroethylene (TFE) based polymers of various degrees of density and porosity such as porous polytetrafluoroethylene (PTFE), for example. They may be sized, treated, coated, or imbibed with agents to augment processing and/or adhesion. For example, the fibers may be etched with a suitable etchant, which may be obtained from W. L. Gore & Associates, Inc., under the tradename TETRA-ETCH®, to improve adhesion between the fluoropolymers 14 and the first and second elastomer jacket layers 16 and 20, respectively.

The bending stiffness of the cable or tubing is not significantly altered by the presence of the fluoropolymer fiber. The fluoropolymer fiber is highly anisotropic and sustains tensile loads, but not compressive loads. Under compressive loads, the fiber collapses on itself without increasing cross-sectional area. As the cable bends, the fibers in tension do not undergo significant elongation; the neutral axis shifts towards the region of the cable cross-section in tension.

As the term is used herein, "porous polytetrafluoroethylene" (PTFE) shall mean a membrane which may be prepared by any number of known processes, for example, by stretching or drawing processes, by papermaking processes, by processes in which filler materials are incorporated with the PTFE resin and which are subsequently removed to leave a porous structure, or by powder sintering processes. Preferably, the porous polytetrafluoroethylene membrane is porous expanded polytetrafluoroethylene membrane having a microstructure of interconnected nodes and fibrils, as described in U.S. Pat. Nos. 3,953,566; 4,187,390; and 4,110,392, which are incorporated herein by reference, and which fully describe the preferred material and processes for making them. The porous polytetrafluoroethylene membrane may have a thickness in a range from about 3 to about 1,000 micrometers, preferably in a range of from about 5 to about 100 micrometers, and a pore volume in a range from about 20 to about 98 percent.

The signal transmission core 12 may be comprised of any suitable elements useful in the transmission of electromagnetic and/or optical signals and/or power. For example, the signal transmission core 12 may be comprised of electrical conductor elements, flexible tubular conduit or fiber optic elements for transmitting data and/or providing power to a system (not shown) and interstitial fillers for providing radial compressive support. The signal transmission core 12 may also be wrapped or covered with a layer of porous polytetrafluoroethylene.

The signal transmission core 12 is jacketed or coated with the first elastomeric jacket layer 16, which may be comprised of any suitable material such as but not limited to: silicones, fluorosilicones, fluororubbers, polyurethane, butyl, hydronated nitrite rubber or EPDM, for example. The first elastomeric jacket layer 16 may be applied by any suitable process, such as by a conventional extrusion process, for example.

A preferred fiber 14 is a fluoropolymer fiber comprised of polytetrafluoroethylene. One example of such a fiber has the following characteristics: a round or flat TFE based polymer, having both a porous and a non-porous surface, with an average diameter of 0.003", a denier of 200, a tenacity >3, and a high service temperature of >260° C.

The fibers 14 are disposed about the first jacket 16 in a predetermined orientation to form the array 18. As best illustrated in FIG. 1, in one embodiment, the fibers 14 are disposed in a braided configuration such that equiangular open portions are defined in the array. By contrast, FIG. 2 displays a fiber array 18 wherein at least some of the fibers 14 are disposed substantially parallel to a longitudinal centerline of the cable core 12 with other fibers 14 being interwoven therewith. FIG. 3 illustrates a fiber array 18 having a plurality of helically served fibers which are disposed about a plurality of fibers 14 disposed substantially parallel to the longitudinal centerline of the cable core 12. Each fiber array 18, illustrated in FIGS. 1–3, define open spaces 22 that permit the first inner elastomer jacket layer 16 to bond with the second outer elastomer jacket layer 20.

In a preferred embodiment, the second outer elastomer jacket layer 20 may be comprised of any suitable material such as but not limited to: silicones, fluorosilicones, fluororubbers, polyurethane, butyl, hydronated nitrite rubber or EPDM, for example.

The cable jacket of the present invention may be formed by first extruding and curing the first inner elastomer jacket layer 16 over the cable core 12. The fluoropolymer fiber 14 is then arranged about the first inner jacket layer 16. The second outer elastomer jacket layer 20 is then extruded over the fiber array 18 and cured. During this extrusion process, the material of the second elastomer jacket layer 20 flows through the open portions 22 to contact and bond with the first inner jacket 16. The first and second jackets 16, 20 fuse or bond together to form a homogeneous structure having the fiber array 18 disposed therein.

Tubing may also be formed in accordance with the teachings of the present invention by first extruding a first tubular shaped elastomer material over a removable circular core or mandrel. Then the first tubular shaped elastomer is cured or vulcanized. The application of a fiber array and the application of a second tubular shaped elastomer material is the same as described hereinabove. The method just described may also be conducted without a removable core or mandrel, such as by applying air pressure to the inner diameter of the tube during each process step. The above-outlined process steps can be done as individual processes, or as a co-extrusion wherein all steps are performed in line or in a continuous process in which the final tubular article is cured in one step. Compression molding techniques may also be used.

Without intending to limit the scope of the present invention, the apparatus and method of production of the present invention may be better understood by referring to the following examples:

EXAMPLE 1

A cable having a fluoropolyer fiber reinforced integral composite cable jacket was manufactured using the following steps and materials. Electrical wires were twisted together or cabled to form a core. The twisted wires were then helically wrapped, covering them completely, with a 0.002 inch thick tape of porous PTFE to an outer diameter of 0.076 inches. A primary silicone jacket (Dow Corning Q7-4750) was extruded, at a thickness of 0.010 inches, over the core and cured at 300° F. A braid was arrayed over the core using 16 ends of a 200 denier high strength porous expanded PTFE fiber. This was done using a braid angle of 20° and a tension of approximately 3 ounces per fiber. A final 0.027 inch thick silicone jacket (Dow Corning Q7-4750) was extruded over the braided core, and then cured at 300° F.

EXAMPLE 2

A tube may be made using the same methods described in Example 1, except the core is substituted by a mandrel of a suitable size. Upon completion of the final extrusion, the mandrel is removed from the core leaving a tube.

Various tests were performed to determine the material properties (tensile strength, elongation, modulus$_{100\%}$, flex and cut-through capacity) of a cable, manufactured in accordance with the techniques herein, after exposure to increasing numbers of autoclave cycles. Also, capacitance was monitored to determine if any shift occurred as a result of the autoclave cycling. Approximately 50 feet of cable was placed into an autoclave at 275° F. At predetermined cycle counts, a test specimen was removed and the following tests were performed.

The test data is presented in Table 2 and Table 3. The tensile and elongation data is divided into two data points, namely, the peak break point tensile strength and elongation for the porous PTFE re-enforcement fiber and the silicone peak break point tensile strength and elongation. The modulus$_{100\%}$ is of the silicone material. Cut-through is in pounds force (lbf) and is a relative reading. Taber stiffness is in gm-cm and also is a relative reading. The capacitance was recorded in pF/72 inches.

Autoclave Tests

Autoclave testing was accomplished cyclically as provided in Table 1. Test samples were placed in the autoclave and exposed to temperatures between 270°–274° F. and pressures between 30–38 psi for time periods of 5 minutes.

Tensile and Elongation and Modulus$_{100\%}$ Tests

Tensile strength, elongation and modulus$_{100\%}$ were determined using a method which follows ASTM D412 (reference straight specimen, Section 11.2) with bench marks for elongation determination. The modulus$_{100\%}$ was chosen as a convenient reference. Test specimens were taken from the autoclave at predetermined cycle counts, as shown in Table 1 and tested. An Instron 4201 Universal Tester, Part No. 10-00030 was employed using the following setup parameters: 1) Crosshead speed, 5 in./min; 2) Chart speed, 1 in./min; 3) Chart Range, 0 to 50 lbf; and 4) Embossed steel grips were used.

Flex Tests

Test specimens of the complete cable were taken from the autoclave at predetermined cycle counts, as shown in Table 1, and flexed in a variety of motions to 100,000 cycles. The test specimens were electrically monitored for center conductor failures. After the flexing, tensile and elongation and modulus$_{100\%}$ tests were performed on the re-enforced silicone jacket, with the core removed, to evaluate any change of the material properties in the flexed area.

Cut-Through Tests

Test specimens were taken from the autoclave at predetermined cycle counts, as shown in Table 1, and cut-through tests were performed on the re-enforced silicone jacket with the core removed to evaluate any change of the material properties as a result of the autoclave cycles.

Taber Stiffness Tests

Test specimens were taken from the autoclave at predetermined cycle counts, as shown in Table 1, and taber stiffness tests were performed on the complete cable to evaluate any change of the material properties as a result of the autoclave cycles.

Capacitance Tests

Test specimens were taken from the autoclave at predetermined cycle counts, as shown in Table 1, and capacitance tests were performed to evaluate any change of the electrical properties as a result of the autoclave cycles. Initial data points were 0 and 200 cycles, but the decision was made to continue data collection to the completion of the autoclave cycle.

TABLE 1

| Autoclave Cycles | Tensile and Elongation | Flex to 100,000 Cycles | Cut- | Taber Stiffness | Capacitance |
|---|---|---|---|---|---|
| 0 | X | X | X | X | X |
| 100 | X | X | X | X | |
| 500 | X | | | | X(200) |
| 750 | X | | | X | |
| 1000 | X | X | | | X |
| 1500 | X | X | X | X | X |

TABLE 2

Tensile Strength and Elongation (psi & %)

| | Non-Flexed | | | | | Flexed | | | | |
|---|---|---|---|---|---|---|---|---|---|---|
| | Fiber Reinforced Silicone | | Silicone | | | Fiber Reinforced Silicone | | Silicone | | |
| Autoclave Cycle Count | Tensile Strength (psi) | El. (%) | Tensile Strength (psi) | El. (%) | Modulus$_{100\%}$ (psi) | Tensile Strength (psi) | El. (%) | Tensile Strength (psi) | El. (%) | Modulus$_{100\%}$ (psi) |
| 0* | N/A | N/A | 1118.2 | 914 | 218.0 | N/A | N/A | N/A | N/A | N/A |
| 0 | 2504.0 | 50 | 1004.0 | 687 | 222.1 | 1894.4 | 39 | 1070.9 | 709 | 232.5 |
| 100 | 2401.9 | 47 | 973.1 | 641 | 212.2 | 1693.4 | 35 | 1137.9 | 650 | 293.8 |
| 500 | 2543.5 | 49 | 1078.9 | 634 | 317.8 | N/A | N/A | N/A | N/A | N/A |
| 750 | 2480.5 | 48 | 1037.8 | 648 | 294.7 | 1935.3 | 36 | 1167.6 | 663 | 320.2 |
| 1000 | 2491.9 | 47 | 998.3 | 637 | 291.4 | N/A | N/A | N/A | N/A | N/A |
| 1500 | 2549.1 | 49 | 893.5 | 629 | 199.9 | 1984.8 | 36 | 913.0 | 643 | 226.0 |

*Homogeneous silicone without fiber reinforcement.
**All silicone is Dow Corning type Q74750.

TABLE 3

| Autoclave Cycle count | Cut-Through | | Taber Stiffness | | Capacitance | | |
|---|---|---|---|---|---|---|---|
| | Average (lbf) | Std Dev (lbf) | Resilience (%) | Initial Stiffness (gm-cm) | Red/Drains (pF/72 in.) | Red/Brown (pF/72 in.) | Red/Blue (pF/72 in.) |
| 0* | 24.5 | 1.16 | N/A | 34 | 220.5 | 89.1 | 89.1 |
| 0 | 32.32 | 2.83 | 65.6 | 41.2 | 221.3 | 89.22 | 86.57 |
| 100 | 32.24 | 1.39 | 63.1 | 48.1 | N/A | N/A | N/A |
| 200 | N/A | N/A | N/A | N/A | 229.35 | 91.5 | 89.25 |
| 500 | N/A | N/A | N/A | N/A | N/A | N/A | N/A |
| 750 | N/A | N/A | 64.8 | 61.3 | N/A | N/A | N/A |
| 1000 | N/A | N/A | 59.7 | 44.3 | 226.08 | 89.45 | 89.51 |
| 1500 | 30.17 | 4.89 | 68 | 58.3 | 225.8 | 88.16 | 88.18 |

*Homogeneous silicone without fiber reinforcement.

Although a few exemplary embodiments of the present invention have been described in detail above, including exemplary jacket constructions and fiber array configurations, those skilled in the art readily appreciate that many modifications are possible without materially departing from the novel teachings and advantages which are described herein. Accordingly, all such modifications are intended to be included within the scope of the present invention, as defined by the following claims.

Having described the invention, what is claimed is:

1. In combination with a signal cable assembly having a signal transmission core with a longitudinal center axis, an improved composite cable jacket comprising:
   a first elastomer jacket layer disposed about the signal transmission core;
   a fiber array disposed about the first elastomer jacket layer, wherein the fiber array is defined by at least two fluoropolymer fibers, and wherein the fiber array defines predetermined open regions; and
   a second elastomer jacket layer disposed about the fiber array, wherein the first elastomer jacket layer is bonded to the second elastomer jacket layer at the predetermined open regions to form a substantially homogeneous structure having said fiber array disposed therein.

2. The invention of claim 1, wherein at least one of the first and second elastomer jacket layers is comprised of silicone.

3. The invention of claim 1, wherein both of the first and second elastomer jacket layers are comprised of silicone.

4. The invention of claim 1, wherein the at least two fluoropolymer fibers are comprised of polytetrafluoroethylene.

5. The invention of claim 4, wherein the polytetrafluoroethylene is defined by a microstructure of nodes and fibrils.

6. The invention of claim 1, wherein the fiber array is arranged in a braided configuration.

7. The invention of claim 1, wherein the fiber array is arranged in a served configuration.

8. The invention of claim 1, wherein fiber is arranged in an axial configuration parallel to each other.

9. The invention of claim 1, wherein the first and second elastomer jacket layers define a composite cable jacket having an inside and an outside surface, and wherein the fiber array is disposed within said composite cable jacket in a location no closer than 0.001 inches from each of the inside and the outside surfaces.

10. An improved composite tubing comprising:
    a first tubular shaped elastomer material;
    a fiber array disposed about said first tubular shaped elastomer material, wherein the fiber array is defined by at least two fluoropolymer fibers, and wherein the fiber array defines predetermined open regions; and
    a second tubular shaped material elastomer disposed about the fiber array, wherein the first and second tubular shaped elastomer materials are bonded together at the predetermined open regions to form a substantially homogeneous structure having said fiber array disposed therein.

11. The invention of claim 10, wherein at least one of the first and second tubular shaped elastomer materials is comprised of silicone.

12. The invention of claim 10, wherein both of the first and second tubular shaped elastomer materials are comprised of silicone.

13. The invention of claim 10, wherein the at least two fluoropolymer fibers are comprised of polytetrafluoroethylene.

14. The invention of claim 13, wherein the polytetrafluoroethylene is defined by a microstructure of nodes and fibrils.

15. The invention of claim 10, wherein the fiber array is arranged in a braided configuration.

16. The invention of claim 10, wherein the fiber array is arranged in a served configuration.

17. The invention of claim 10, wherein the fiber array is arranged in an axial configuration parallel to each other.

18. The invention of claim 10, wherein the first and second jackets define an integral composite tube having an inside and an outside surface, and wherein the fiber array is disposed within said tube in a location no closer than 0.001 inches from each of the inside and the outside surfaces.

* * * * *